(12) United States Patent
Liao

(10) Patent No.: US 8,081,195 B2
(45) Date of Patent: Dec. 20, 2011

(54) METHOD FOR INCREASING OPERATION SPEED IN VIRTUAL THREE DIMENSIONAL (3D) APPLICATION AND OPERATIONAL METHOD THEREOF

(75) Inventor: Yu Cheng Liao, Jhubei (TW)

(73) Assignee: Generalplus Technology Inc., Hsinchu (TW)

( * ) Notice: Subject to any disclaimer, the term of this patent is extended or adjusted under 35 U.S.C. 154(b) by 833 days.

(21) Appl. No.: 12/122,000

(22) Filed: May 16, 2008

(65) Prior Publication Data
US 2009/0201300 A1 Aug. 13, 2009

(30) Foreign Application Priority Data
Feb. 12, 2008 (TW) .............................. 97104754 A

(51) Int. Cl.
*G06T 1/00* (2006.01)
(52) U.S. Cl. ........ 345/619; 345/660; 345/649; 382/154; 382/276; 382/285; 382/289

(58) Field of Classification Search .................. None
See application file for complete search history.

(56) References Cited

U.S. PATENT DOCUMENTS 7,313,710 B1 * 12/2007 Holmer ..................... 713/320
2008/0018732 A1 * 1/2008 Moller ....................... 348/51

* cited by examiner

*Primary Examiner* — Kee M Tung
*Assistant Examiner* — Michelle Chin
(74) *Attorney, Agent, or Firm* — Muncy, Geissler, Olds & Lowe, PLLC

(57) ABSTRACT

The present invention relates to a method for increasing operation speed in virtual three dimensional (3D) application and an operational method thereof. The method includes the steps of: providing a display frame, which includes a plurality of scan lines; dividing the display frame into at least one first area and a second area; providing a plurality of virtual 3D parameters according to the scan lines; and truncating a preset number of least significant bits (LSBs) of the virtual 3D parameters corresponding to the scan lines in the first area.

4 Claims, 4 Drawing Sheets

METHOD FOR INCREASING OPERATION SPEED IN VIRTUAL THREE DIMENSIONAL (3D) APPLICATION AND OPERATIONAL METHOD THEREOF

BACKGROUND OF THE INVENTION

1. Field of Invention

The invention relates to the technology associated with image processing, and more particularly to a method for increasing operation speed in virtual 3D application.

2. Related Art

Recently, the technology is advanced. So, a conventional game console having a flat image display is gradually replaced with another game console with 3D image processing. FIG. 1 is a schematic illustration showing a concept of simple 3D image processing applied to a conventional game console. As shown in FIG. 1, a tile 11 on the floor in a lower portion of a frame 101 is larger than a tile 12 in an upper portion of the frame 101 so that the distance difference can be seen from the drawing. Correspondingly, a user (player) can imagine that he or she stands on the floor at the lower portion of the frame and looks forwards. Basically, the concept of this virtual 3D image processing is to achieve the effect of simulating the floor in the 3D space according to the two-dimensional (2D) plane by adjusting the scaling ratio of each scan line.

In order to achieve the above-mentioned effects, graphic data, such as a map, previously stored in a memory is rotated and scaled, and then projected onto a display frame according to the following equation:

$$\begin{bmatrix} X \\ Y \end{bmatrix} = \begin{bmatrix} w \times \cos\theta & -w \times \sin\theta \\ w \times \sin\theta & w \times \cos\theta \end{bmatrix} \begin{bmatrix} X' - X\_Off \\ Y' - Y\_Off \end{bmatrix} + \begin{bmatrix} Tx\_X \\ Tx\_Y \end{bmatrix},$$

wherein X' and Y' are pixels on the display screen; X and Y are coordinates of the map; X_Off, Y_Off, Tx_X and Tx_Y are parameters that may be adjusted by the user (e.g., Tx_X and Tx_Y may correspond to an object, such as a racing car, operated by the user); w is a scaling parameter; and cos θ and sin θ are rotation parameters.

If the frame of the game console has the standard VGA resolution (640×480), X' ranging from 0 to 639 and Y' ranging from 0 to 479 have to be substituted into the equation so that the pixel of the screen corresponding to the coordinates of each pixel of the map can be obtained.

The scaling parameter w has a very large fluctuating range. Generally speaking, the scaling parameter w on the uppermost portion of the frame is very large and typically has about 17 bits, and the scaling parameter w on the bottommost portion of the frame is very small and typically has about 8 bits. So, when a virtual 3D processor is being designed, a 17-bit multiplier has to be built in the hardware thereof. In general, the lower portion of the frame corresponds to the scene closer to the operated object, while the upper portion of the frame corresponds to the scene farther from the operated object. In other words, a clearer frame having the higher resolution is needed in the lower portion of the frame, while the clearer frame is not needed in the upper portion of the frame. That is, the upper portion of the frame only needs to have the lower resolution.

However, the above-mentioned design has a very great drawback. The lower portion of the frame only can have the 8-bit resolution, but the upper portion of the frame, which does not need the so-high resolution because the scene is far and is scaled down a lot, has the 17-bit resolution. Therefore, the display effect will not become better, but the required hardware multiplier has to be the 17-bit multiplier. If the number of bits of the multiplier is too great, the number of required clocks is increased so that the overall operation speed is slowed down. Meanwhile, the area required by the integrated circuit is increased, a lot of hardware cost may be increased correspondingly.

SUMMARY OF THE INVENTION

It is therefore an object of the invention to provide a method for increasing operation speed in virtual 3D application, and an operational method thereof for reducing the hardware usage and decreasing the cost.

The invention achieves the above-mentioned object or other objects by providing a method for increasing operation speed in virtual three dimensional (3D) application. The method includes the steps of: providing a display frame, which includes a plurality of scan lines; dividing the display frame into at least one first area and a second area; providing a plurality of corresponding virtual 3D parameters according to the scan lines; and truncating a preset number of least significant bits of the virtual 3D parameters corresponding to the scan lines in the first area.

In addition, the invention provides a virtual 3D image operational method. The method includes the steps of: providing a display frame, which includes a plurality of scan lines; dividing the display frame into at least one first area and a second area; providing a plurality of corresponding virtual 3D parameters according to the scan lines; truncating a preset number of least significant bits of the virtual 3D parameters corresponding to the scan lines in the first area to obtain a plurality of corrected operational parameters; respectively multiplying the pixels of the scan lines by the corresponding corrected operational parameters in the first area; respectively multiplying the pixels of the scan lines by the corresponding virtual 3D parameters in the second area; and shifting all operational results corresponding to the first area by the preset number of bits.

In the method for increasing the operation speed in the virtual 3D application and the operational method according to the preferred embodiment of the invention, the virtual 3D parameters include rotation parameters and scaling parameters for the scan lines. In one embodiment, the method may further include the step of: providing an indication bit for each of the corresponding virtual 3D parameters, wherein the indication bits for the corresponding virtual 3D parameters corresponding to the scan lines in the first area are different from the indication bits for the corresponding virtual 3D parameters corresponding to the scan lines in the second area.

The spirit of the invention is to assign the higher number of bits to the area of the display frame, which needs the higher resolution, and to truncate the unimportant decimal points from the area of the display frame which does not need the so-high resolution. Although the resolution of a certain portion of the display frame is poor, this portion is far from the user and is scaled down a lot on the display frame, no significant difference will be caused on the user's visual feeling. In the display frame, the scene in the area closer to the user can have the better effect. Thus, the lower hardware requirement and the faster operational speed can be obtained according to the invention.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE INVENTION

The present invention will be apparent from the following detailed description, which proceeds with reference to the accompanying drawings, wherein the same references relate to the same elements.

Figure 1:
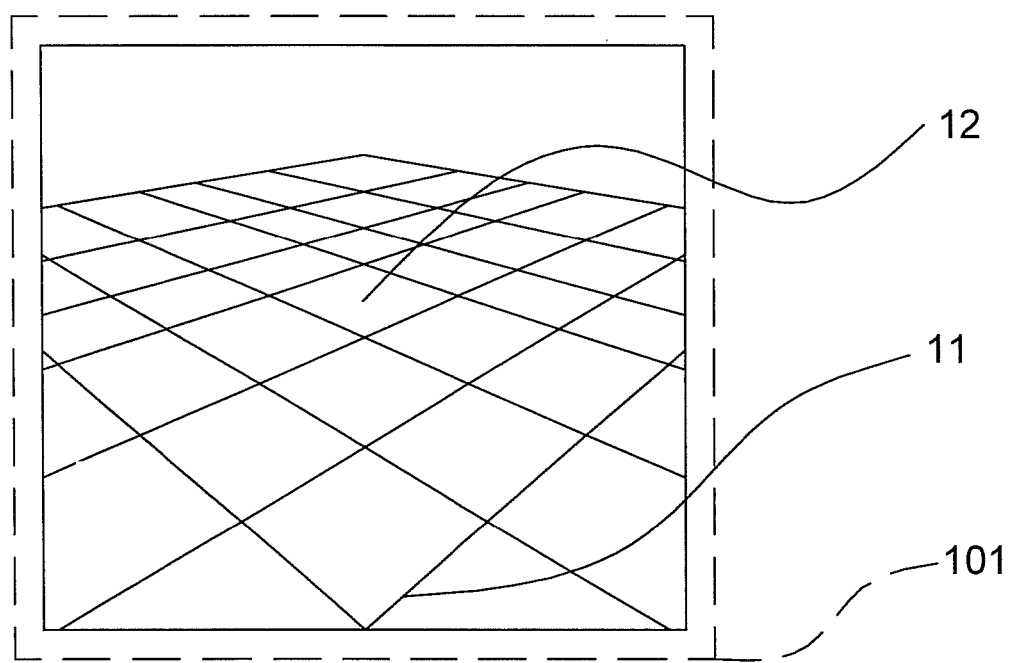
FIG. 1 is a schematic illustration showing a concept of simple 3D image processing applied to a conventional game console.
Figure 2:
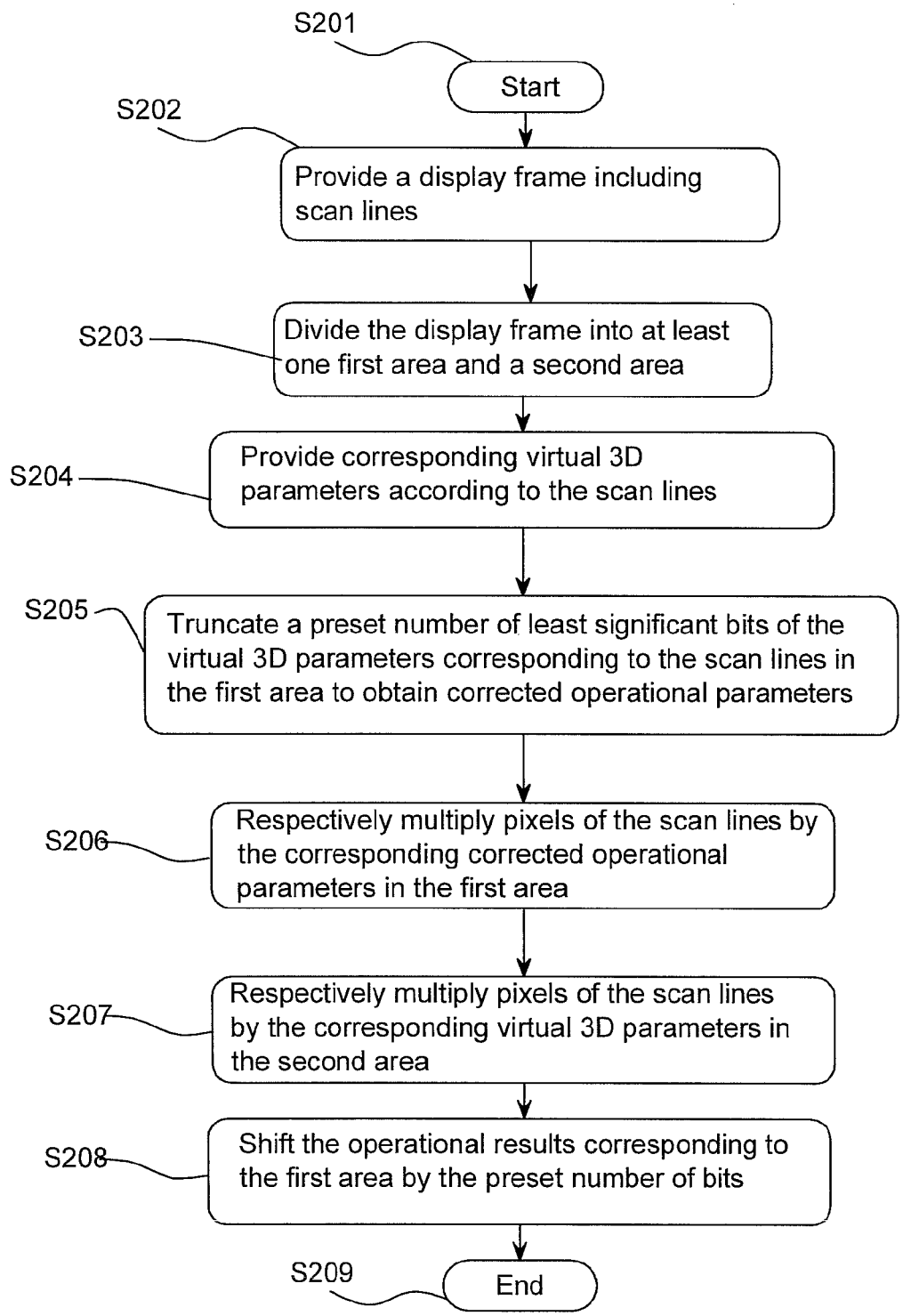
FIG. 2 is a flow chart showing a virtual 3D image operational method according to an embodiment of the invention.
Figure 3:
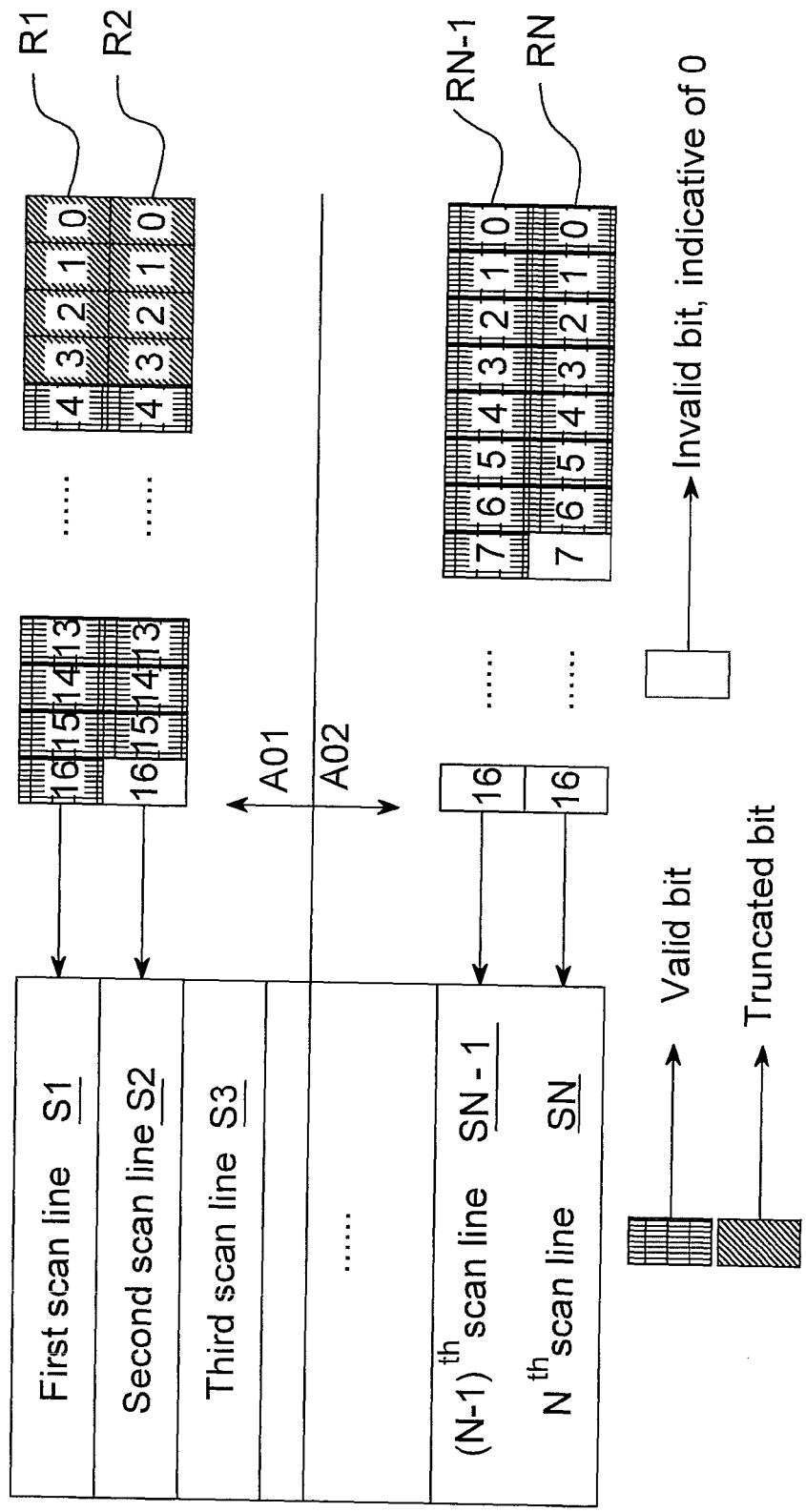
FIG. 3 is an auxiliary illustration showing the virtual 3D image operational method according to the embodiment of the invention.

FIG. 2 is a flow chart showing a virtual 3D image operational method according to an embodiment of the invention. FIG. 3 is an auxiliary illustration showing the virtual 3D image operational method according to the embodiment of the invention. Referring to FIGS. 2 and 3, this method includes the following steps.

In step S201, the method starts.

In step S202, a display frame including a plurality of scan lines S1 to SN is provided.

In step S203, the display frame is divided into at least one first area A01 and a second area A02.

In step S204, a plurality of corresponding virtual 3D parameters is provided according to the scan lines. In general, the virtual 3D parameters include the rotation parameters cos θ and sin θ and the scaling parameter w, as mentioned in the prior art. These parameters are generated when the user is operating the game. For example, when the user is playing the car racing game by controlling the car to turn and by controlling the angle of view, the scan lines on each frame have different rotation parameters cos θ and sin θ and different scaling parameters w.

In step S205, a preset number of least significant bits of the virtual 3D parameters corresponding to the scan lines in the first area A01 are truncated so that a plurality of corrected operational parameters is obtained. According to the prior art, the upper portion of the display frame does not need the area with the so high resolution, but the virtual 3D parameters corresponding to this area have the 17-bit resolution, thereby requiring the 17-bit multiplier serving as the hardware multiplier. In this embodiment, the highest bit of the multiplier is set to be 13 bits. Thus, the last four least significant bits (LSBs) of each virtual 3D parameter in the first area A01 are round down to serve as the corrected operational parameter. Therefore, the corrected operational parameter has the maximum of 13 bits. As s shown in FIG. 3, the last four LSBs of the first virtual 3D parameter R1 and the second virtual 3D parameter R2 are truncated.

In step S206, the pixels of the scan lines in the first area A01 are respectively multiplied by the corresponding corrected operational parameters.

In step S207, the pixels of the scan lines in the second area A02 are respectively multiplied by the corresponding virtual 3D parameters.

In step S208, all operational results corresponding to the first area A01 are shifted by the preset number of bits. Because four LSBs of each virtual 3D parameter of the first area A01 are truncated, four 4 bits have to be added back.

In step S209, the method ends.

Figure 4:
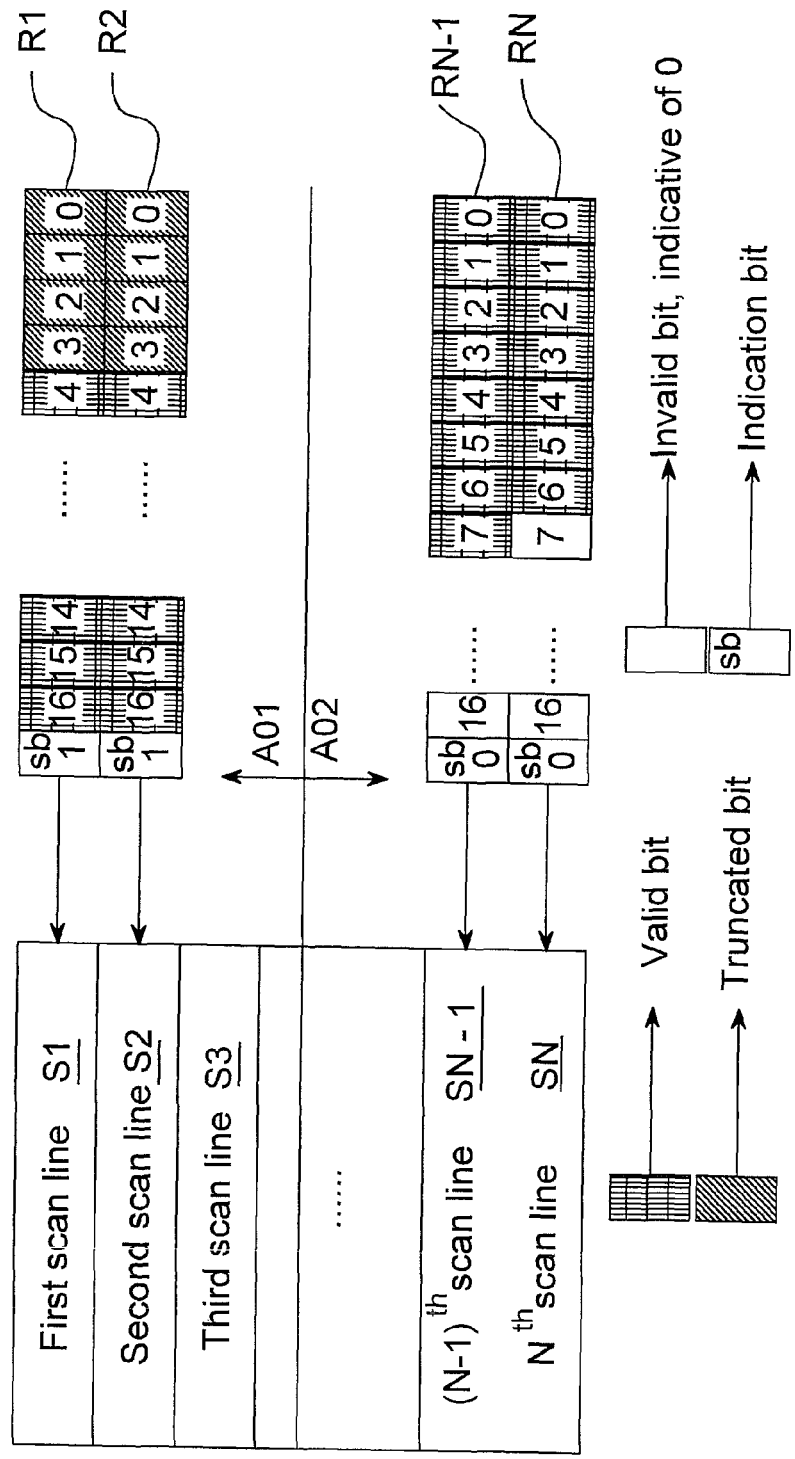
FIG. 4 is another auxiliary illustration showing the virtual 3D image operational method according to the embodiment of the invention.

Although the embodiment has clearly illustrated one of the aspects according to the invention, one of ordinary skill in the art may easily understand that the invention is not limited thereto. FIG. 4 is another auxiliary illustration showing the virtual 3D image operational method according to the embodiment of the invention. As shown in FIG. 4, one indication bit for indicating that the virtual 3D parameter is in the first area A01 or the second area A02 is added to each of the virtual 3D parameters according to the embodiment of FIG. 4. When the virtual 3D parameter is in the first area A01, the indication bit sb is equal to 1. When the virtual 3D parameter is in the second area A02, the indication bit sb is equal to 0. However, one of ordinary skill in the art may easily understand that the value (1 or 0) of the indication bit may be adjusted according to the actual design, and detailed descriptions thereof will be omitted. In addition, although the display frame is divided into two areas in the above-mentioned example, one of ordinary skill in the art may easily understand that the display frame may further be divided into four or eight areas, for example, so that the usage efficiency of the multiplier may be higher and the interfaces between the areas may become smoother.

In summary, the spirit of the invention is to assign the higher number of bits to the area of the display frame, which needs the higher resolution, and to truncate the unimportant decimal points from the area of the display frame, which does not need the so-high resolution. Although the resolution of a certain portion of the display frame is poor, this portion is far from the user and is scaled down a lot on the display frame, no significant difference will be caused on the user's visual feeling. In the display frame, the scene in the area closer to the user can have the better effect. Thus, the lower hardware requirement and the faster operational speed can be obtained according to the invention.

While the invention has been described by way of examples and in terms of preferred embodiments, it is to be understood that the invention is not limited thereto. To the contrary, it is intended to cover various modifications. Therefore, the scope of the appended claims should be accorded the broadest interpretation so as to encompass all such modifications.

What is claimed is:

1. A virtual 3D image operational method, comprising:
providing a display frame, which includes a plurality of scan lines;
dividing the display frame into at least one first area and a second area;
providing a plurality of corresponding virtual 3D parameters according to the scan lines;
truncating a preset number of least significant bits of the virtual 3D parameters corresponding to the scan lines in the first area to obtain a plurality of corrected operational parameters;
respectively multiplying pixels of the scan lines by the corresponding corrected operational parameters in the first area;

respectively multiplying pixels of the scan lines by the corresponding virtual 3D parameters in the second area; and shifting all operational results corresponding to the first area by the preset number of bits.

2. The method according to claim 1, wherein the virtual 3D parameters comprise rotation parameters for the scan lines.

3. The method according to claim 1, wherein the virtual 3D parameters comprise scaling parameters for the scan lines.

4. The method according to claim 1, further comprising the step of:

providing an indication bit for each of the corresponding virtual 3D parameters, wherein the indication bits for the corresponding virtual 3D parameters corresponding to the scan lines in the first area are different from the indication bits for the corresponding virtual 3D parameters corresponding to the scan lines in the second area.

* * * * *